United States Patent [19]

Moran

[11] 4,449,657

[45] May 22, 1984

[54] AUTO LUGGAGE CARRIER

[76] Inventor: Frank Moran, 5214 Viola Dr., Austintown, Ohio 44515

[21] Appl. No.: 400,463

[22] Filed: Jul. 21, 1982

[51] Int. Cl.³ .............................................. B60R 9/04
[52] U.S. Cl. .................................... 224/329; 224/331; 224/322
[58] Field of Search ............... 224/319, 321, 309, 315, 224/323, 322, 329, 331

[56] References Cited

U.S. PATENT DOCUMENTS 3,064,868 11/1962 Treydte ................................ 224/322
3,174,536 3/1965 Francis ................................ 224/309
3,381,866 5/1968 Wickett ............................... 224/319
4,101,061 7/1978 Sage et al. .......................... 224/322

Primary Examiner—Steven M. Pollard
Assistant Examiner—David Voorhees
Attorney, Agent, or Firm—Harpman & Harpman

[57] ABSTRACT

An auto luggage carrier comprising multiple support units, each of which having a cross bar secured to the vehicle at its respective ends. Vertically adjustable load supports adjacent the units ends match the vehicles top configuration and secure the support units to the vehicle.

5 Claims, 2 Drawing Figures

AUTO LUGGAGE CARRIER

BACKGROUND OF THE INVENTION (1) Technical Field

This invention relates to auto luggage carriers of the type that are positioned on the roof of a vehicle and on which luggage or other cargo is secured.

(2) Description of the Prior Art

Prior art devices of this type have relied on a variety of different designs. See for example U.S. Pat. Nos. 2,574,018, 2,853,119, 2,436,228 and 3,109,569.

In U.S. Pat. No. 2,574,108, a luggage rack for an auto is disclosed having a foot which supports the rack and rests on the vehicle's top independent of clamps that secure the rack and foot to the vehicle's top.

In U.S. Pat. No. 2,853,119 a seat support is disclosed on a vehicle's top with a pair of main support bars resting on vertical support members and secured by a threaded rod clamp adjacent its ends.

U.S. Pat. No. 2,436,228 is a luggage carrier having an adjustable support rack resting on foot members on the vehicle's roof with separate clamping means for securing the same to the vehicle.

Finally, in U.S. Pat. No. 1,309,569, a car top carrier is disclosed wherein a pair of spaced luggage bars are supported on the vehicle's top by a pivoted bracket from which extends a turn buckle type clamp securing the rack to the vehicle.

Applicant's device utilizes a cross bar secured to the vehicle by a load supporting vertically adjustable members which not only supports the load of the cross bar, but secures the cross bar to the vehicles roof by extending through a vertical support member attached to the ends of the bars and to the vehicle.

SUMMARY OF THE INVENTION

An auto luggage carrier for use on the roof of a vehicle to secure luggage or other cargo thereto. The luggage carrier is comprised of multiple support units, each having a bar extending transversely across the vehicle's top and secured to a gutter portion of the top. Each unit is secured at opposite ends by a combination of an adjustable vertical load support member and an apertured bracket that clamps the carrier securely to the gutter. Tie down members are threadably secured to the ends of the bars to provide secure tie down points for the carrier.

DESCRIPTION OF THE PREFERRED EMBODIMENT

Figure 1:
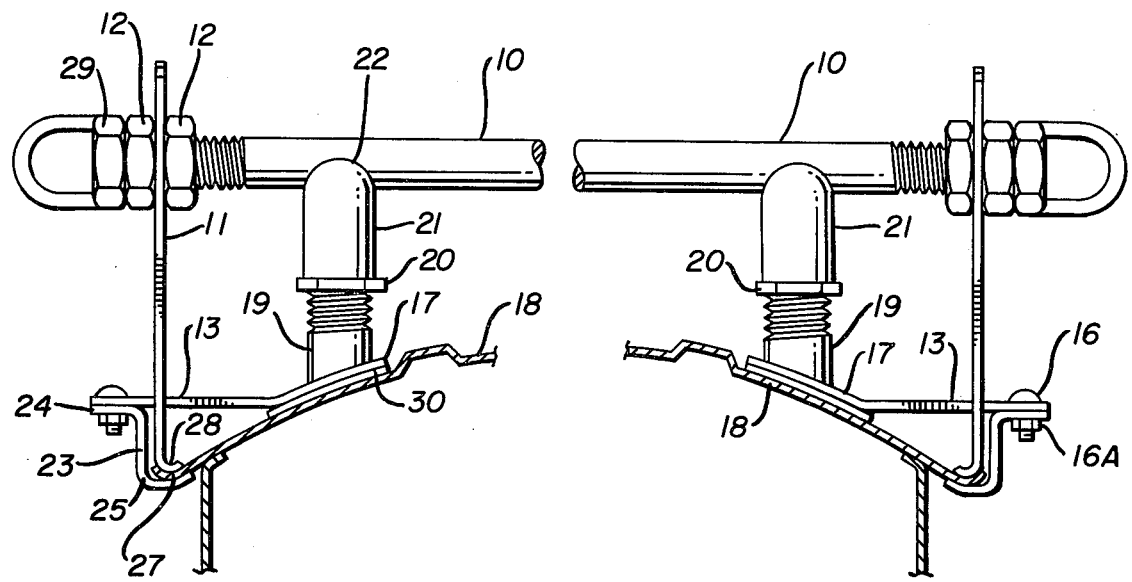
FIG. 1 is an elevational view of the luggage carrier mounted on a vehicle roof.
Figure 2:
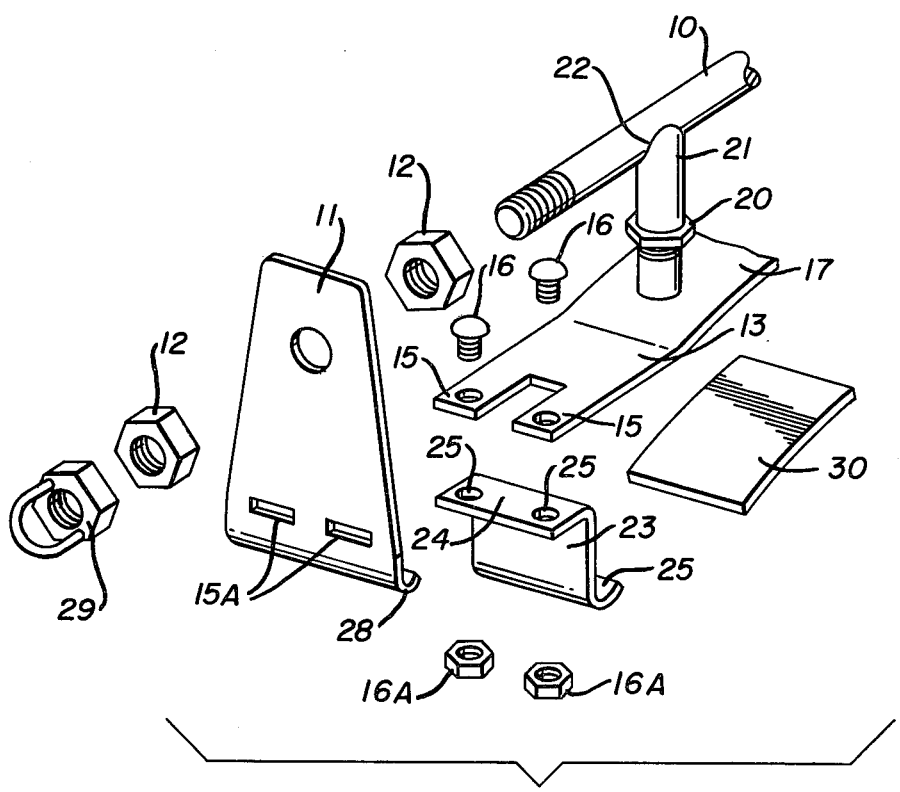
FIG. 2 is an exploded view of a portion of the luggage carrier.

An auto luggage carrier as seen in FIGS. 1 and 2 of the drawings, comprises a pair of support units, each one comprising a bar 10 threaded on its opposite ends. A multiple apertured bracket 11 is positioned on the opposite ends of the bar 10 and is held in place by a pair of threaded nuts 12 positioned on the bar 10 on opposite sides of the apertured bracket 11 through which the bar 10 passes.

A rectangular bracket 13 is bifurcated at one end forming tabs 15 which register within apertures 15A in said bracket 13. Each of the tabs 15 is apertured inwardly from its ends to accept fasteners 16 therethrough. The other end of the rectangular bracket 13 is formed as at 17 to match the contour of a vehicle's roof 18. A threaded post 19 is secured to the formed portion 17 of the apertured bracket 11 and has a threaded nut 20 thereon. A sleeve 21 has a U-shaped notch 22 transversely across one end and is positioned over the post 19 abutting the nut 20.

It will be seen that by rotating the nut 20, the sleeve 21 will move accordingly engaging the bar 10 within the U-shaped notch 22 so as to allow for vertical adjustment of the apertured bracket 11 in relation to the bar 10. A clamping member 23 has a pair of oppositely disposed flanges 24 and 25 which abut the bifurcated tabs 15 and the vehicle's top 18 respectively. The flange 24 is apertured at 25a through which the fasteners 16 pass securing the apertured bracket 11 and the rectangular bracket 13 to the vehicle's roof 18.

The flange 25 is curved to conform with and engage under a gutter portion 27 of the vehicle's top 18. The apertured bracket 11 has a curved flange 28 along its bottom edge which engages the top of the gutter 27.

It will be seen that the fastener 16 with the nut 16A secure the clamping member 23 to the tabs 15 which pass through the apertured bracket 11 effectively clamping the assembly to the gutter portion 27 as best seen in FIG. 1 of the drawings. Once in place, U-shaped threaded members 29 are threaded on the ends of the bar 10 providing tie-down points to secure the load to multiple support units on the vehicle's top.

A resilient pad 30 of a shape and size equal to that of the end portion 17 of the rectangular member 13 is positioned under said portion 17 effectively protecting the vehicle's top 18 from abrasion.

The completed assembly is easily adjusted to conform with different vehicle top configurations and widths with ease of installation and providing an adjustable stable support system for carrying a variety of different sized articles.

Thus it will be seen that a new and useful luggage support device has been illustrated and described and it will be apparent to those skilled in the art that various changes and modifications may be made herein without departing from the spirit of the invention and having thus described my invention, what I claim is:

1. An auto luggage carrier for mounting on the roof of a vehicle, said carrier having multiple support units, each unit comprising at least one bar positioned transversely of said vehicle's roof, dual means for adjustably supporting said bar on said vehicle, threaded end portions on said ends of said bars, a pair of spaced threaded nuts on said threaded end, an apertured bracket secured to said bar between said spaced nuts and extending to the roof of said vehicle, a post having threads adjacent an end, a sleeve movably positioned on said post, a bifurcated bracket secured to said post and removably secured to said apertured bracket, means for securing said apertured bracket and said bracket to a vehicle's top and wherein said dual means for adjustably supporting said bar are spaced with respect to one another.

2. The auto luggage carrier of claim 1 wherein said apertured bracket has a curved flange along its lower edge.

3. The auto luggage carrier of claim 1 wherein said means for securing said apertured bracket and said bracket to said vehicle's top comprises a clamping member having oppositely disposed flanges, one of which is apertured to receive fasteners therethrough.

4. The auto luggage carrier of claim 1 wherein a portion of said bracket to which said post is secured is contoured to said vehicle's top and a resilient pad is positioned between said contoured portion of said bracket and the vehicle's top.

5. The auto luggage carrier of claim 1 wherein said sleeve has a U-shaped notch transversely across one end positioned over said post abutting a nut on said post.

* * * * *